United States Patent [19]
De Villepoix et al.

[11] Patent Number: 5,570,891
[45] Date of Patent: Nov. 5, 1996

[54] TORIC JOINTS HAVING AN ALTERNATING DIAMETER FOR USE IN A PACKING BOX

[75] Inventors: Raymond De Villepoix, Donzere; Christian Rouaud, Bourg Saint-Andeol, both of France

[73] Assignee: Commissariat a l'Energie Atomique, France

[21] Appl. No.: 487,451

[22] Filed: Jun. 7, 1995

[30] Foreign Application Priority Data

Jun. 14, 1994 [FR] France .................. 94 07250

[51] Int. Cl.$^6$ ...................................... F16J 15/28
[52] U.S. Cl. ....................... 277/117; 277/123; 277/236
[58] Field of Search ....................... 277/123, 124, 277/125, 112, 105, 106, 235 A, 117, 118, 236

[56] References Cited

U.S. PATENT DOCUMENTS

| | | | |
|---|---|---|---|
| 1,820,984 | 9/1931 | McKee | 277/124 |
| 3,907,307 | 9/1975 | Maurer et al. | 277/124 |
| 4,302,020 | 11/1981 | Morales | 277/205 |
| 4,477,057 | 10/1984 | Friess | 277/236 |
| 5,433,456 | 7/1995 | Nicholson | 277/236 |
| 5,520,398 | 5/1996 | Brandon | 277/26 |

FOREIGN PATENT DOCUMENTS

| | | | |
|---|---|---|---|
| 0485160 | 5/1992 | European Pat. Off. | |
| 0529928 | 3/1993 | European Pat. Off. | |
| 402031082 | 2/1990 | Japan | 277/125 |
| 403113177 | 5/1991 | Japan | 277/125 |
| 1569479 | 6/1990 | U.S.S.R. | 277/124 |
| 0554094 | 6/1943 | United Kingdom | 277/117 |

OTHER PUBLICATIONS

K. Trutnovsky, "Berührengsdichtungen", 1975, Springer Verlag, Berlin pp. 196 & 197, Figures 21.8–21.10.

*Primary Examiner*—William A. Cuchlinski, Jr.
*Assistant Examiner*—John L. Beres
*Attorney, Agent, or Firm*—Dvorak and Traub

[57] ABSTRACT

Packing box whose seal lining is composed of joints having a circular or approximately circular section and provided with different diameters so that they alternately rest on the rod (9) of the packing box and the housing (2) in which they are pressed. Excellent imperviousness is obtained and the joints may be metallic which makes it possible to use the packing box at high temperatures.

12 Claims, 3 Drawing Sheets

5,570,891

TORIC JOINTS HAVING AN ALTERNATING DIAMETER FOR USE IN A PACKING BOX

FIELD OF THE INVENTION

The invention concerns a packing box for the elastic mounting of joints.

BACKGROUND OF THE INVENTION

Packing boxes are sealing devices mechanically embodying static or semi-dynamic imperviousness concerning the movement of shafts or control rods between an internal element and an external element. When a movement occurs, this is in principle alternative on rotating or moving. Packing boxes are extremely numerous in industry and in particular in industries producing cocks or valves where each of these units possesses at least one of these devices for movement of the control rod.

Generally speaking, a packing box in accordance with FIG. 1 is formed of a packing 1 acting as a sealing lining and disposed in a packing box 2 hollowed in a solid element, such as a valve body 3, a rammer 4 for compressing the packing, tightening bolts for producing the force for compressing the packing 1, and a set of elastic washers 6 disposed in this instance coaxially to the rod of the bolts 5 between the tightening nuts 7 and a thrustor 8 of the rammer 4 so as to suitably adjust the force for compressing the packing 1. The control rod 9, which passes through the perforations of the rammer 4, its thrustor 8 and the body of the valve 3, also extends through the packing box 2 and the axial compression produced on the packing 1 results in causing an expansion of the packing 1 in a radial direction against the control rod 9, thus rendering imperviousness along the latter.

According to the type of industry or more specifically according to the working conditions governed by the nature of the fluid and the pressure and temperature levels, different types of packings 1 have been proposed, such as asbestos wire-based braids, carbon and graphite fiber braids, glass fiber braids, metallic fiber braids or superimposed expanded graphite rings or polymer rings of various compositions having a rectangular, triangular or V-shaped section.

The performances of a packing box vary as a large number of parameters are involved. The linings constituted by a stacking of expanded graphite or PTFE (widely known under the name of Teflon) rings therefore require that the packing box 2 is completely closed so as to prevent any leak occurring. In order to achieve this, the mechanical plays as regards the control rod 9 need to be reduced to a strict minimum, either by retightening the bores of the valve body 3 and rammer, or by disposing rings made of a hard material and with appropriate dimensions which is placed at the bottom of the packing box 2 and under the rammer 4. The packing 1 is then compressed between the rings in question, which requires that the packing box 2 be elongated.

The choice of packings is also limited to high temperatures.

SUMMARY OF THE INVENTION

The object of the invention is to resolve the above-mentioned limitations and concerns an extremely simple type of packing box whilst offering excellent sealing characteristics. As shall be seen subsequently, the packing box can be made completely of metallic materials and is thus able to resist temperature rises. It is characterised in that the stacked joints, which constitute the packing and consist of toric joints with an open annular section or similar shaped section, belong to two categories, one having an internal face which touches the rod, and the other having an external face touching the peripheral edge of the packing box, the joints of the two categories being stacked alternately and touched by conical-shaped surfaces or those having an oblique orientation instead of being perpendicular to the axis of the rod. The main advantage of this type of mounting obtained with joints in contact by virtue of almost linear surfaces of joints with a rounded section, such as toric joints, is that the conversion of the axial force for compressing the packing into a radial sealing force is guaranteed by the sliding of the joints on one another to the conical surfaces and by their resultant thrusting on the rod and the wall of the packing box. This sliding is rendered possible by the small mount of friction between the joints which originates from the almost filiform nature of their contact surfaces. Another characteristic of these surfaces is the large amount of contact pressure exerted on them and thus the excellence of imperviousness. These advantages are increased with fully metallic joints whose high elasticity and resistance allow for extremely small contact surfaces, easy conversion of the tightening forces and a compensation of the wear caused by movements of the rod as the joints then slide over one another without changing shape and therefore retaining their original properties. Excellent behaviour of the packing box is obtained as imperviousness is preserved after thousands of handlings.

BRIEF DESCRIPTION OF THE DRAWINGS

There now follows a non-restrictive description given by way of example of the invention with the aid of the following annexed figures.

DETAILED DESCRIPTION OF THE PREFERRED EMBODIMENTS

Figure 2:
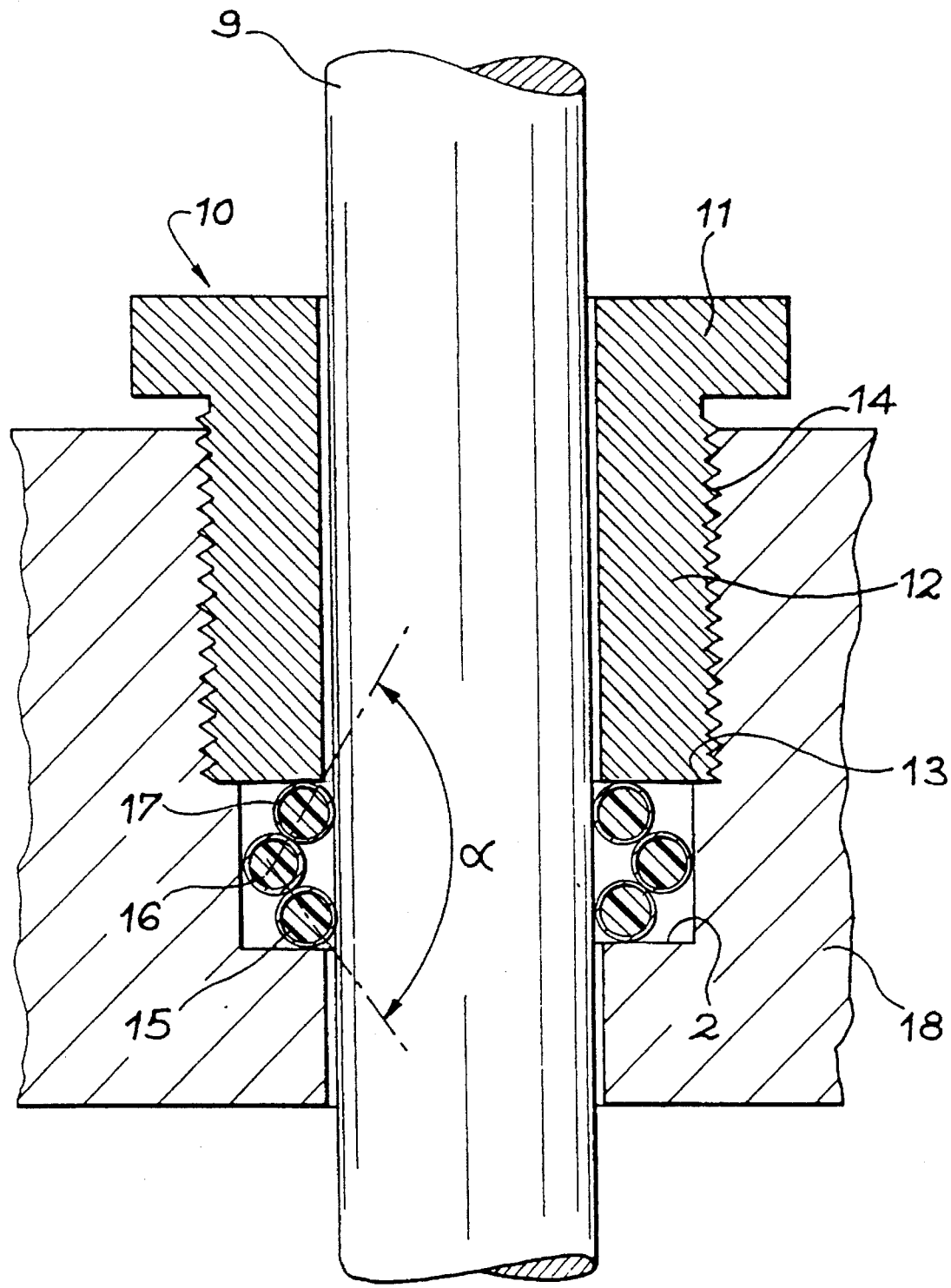
FIG. 2 shows a packing box conforming to the invention.

FIG. 2 shows the packing box 2 in the valve body (here 18), as well as the control rod 9, and a rammer 10 which, so as to illustrate another embodiment possibility, slightly differs from the preceding one but without having any real significance. The rammer 10 here is a hollow screw composed of a handling head 11 which extends above the valve body 18 and a pressing portion 12 engaged in an extension 13 of the packing box 2 above the latter. Threadings 14 connect the pressing portion 12 to the extension 13. Therefore, no thrustor is needed for the rammer 10.

Three elastic metallic joints adjacent to each other are tightened and enclosed in the packing box 2. They bear the references 15, 16 and 17 in the direction of the rammer 10. In this embodiment, these three joints are toric joints and the diameter of their sections is selected according to the width of the packing box 2 so that the lines connecting two-by-two the centers of their sections produce prior to tightening an isosceles triangle whose angle at the summit $\alpha$ has a value of between 110° and 140°. The median joint 16 is thrusted against the circular face (peripheral) of the packing box via its outer face, the extreme joints 15 and 17 against the surface of the control rod 9 via their internal face.

Tightening is effected with specific compresssion force, namely that it is halted when the rammer 10 stops at the end of the extension 13. The joints 15, 16 and 17 are thus protected from any excessive or uncontrolled tightening.

According to certain possible embodiment variants of the invention, the median joint 16 may have a section differing from those of the extreme joints and having for example a smaller or larger diameter, and the rammer may be a metallic crown having an elbow-shaped half-section clamped onto the valve body by means of nuts and bolts and it is possible to select metallic joints, such as from known types of elastic joints commercialized under the names of Hélicoflex, C'ring or O'Ring. Preference shall be given to the flexible metallic joints which possess an elastic core constituted by a helical spring with contiguous spires for their elastic remanence quality enabling them to be definitively tightened throughout the lifetime of the device with an originally applied fixed force. The metal may be of various natures (aluminium, silver, copper, brass, stainless steel, Inconel) depending in particular on the quality of the rod. The metal may be plated, coated, heat or chemically treated or hardened by means of ionic implantation or even lubricated on aerosol-mounting with a PTFE or molybdenum bisulfurated aerosol can. The joints are mainly of the same type and nature except for the central joint which may possibly be composed of a metal differing from that of the others.

Figure 1:
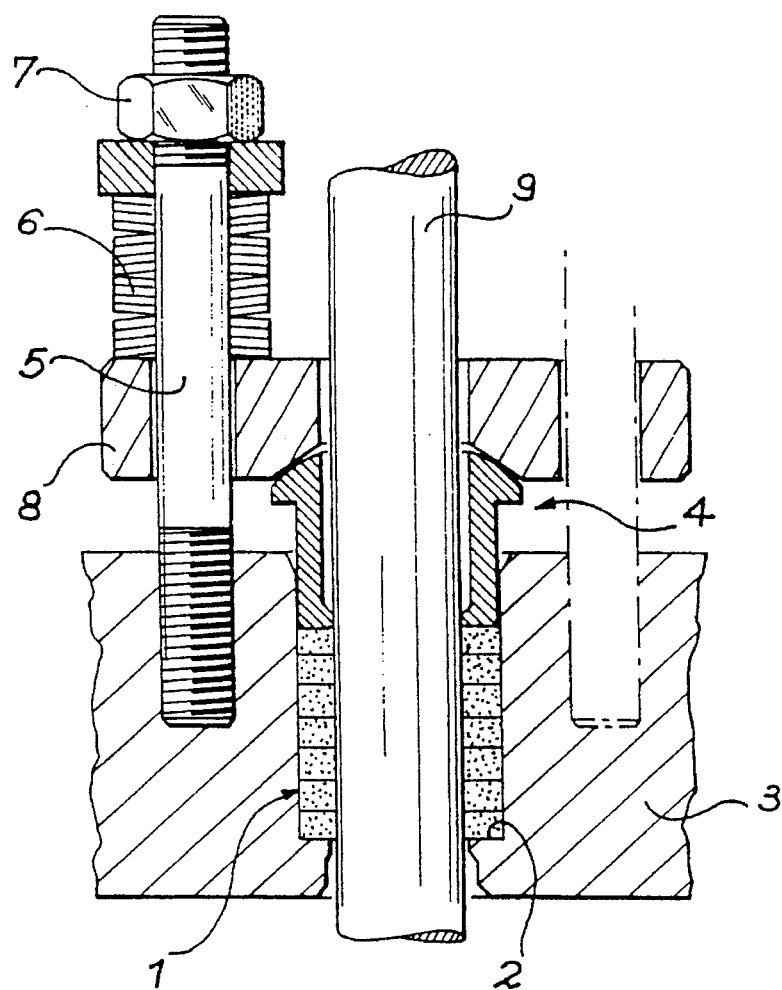
FIG. 1, already described, shows a known type of packing box.
Figure 3A:
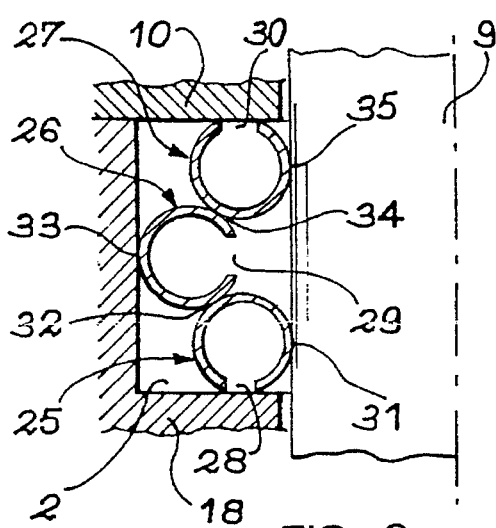
FIGS. 3a and 3b show two embodiment variants of FIG. 2, and FIGS. 4 and 5 show two other embodiment variants.
Figure 3B:
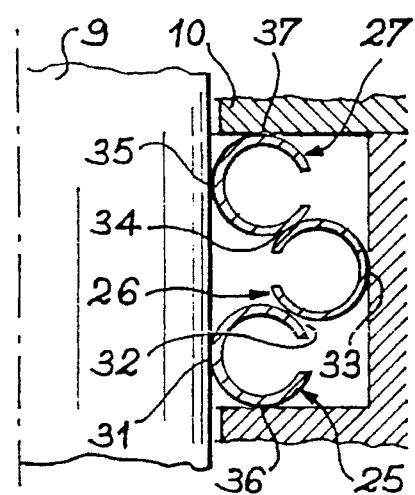

When the joints composing the lining are Hélicoflex or C'Ring type joints, the openings of their outer casings are orientated in such a way that all the required and sufficient sealing lines are observed, as shown on FIGS. 3a and 3b.

These joints 25, 26 and 27 have in fact an open annular section, that is are molten tubes. In the disposition, of FIG. 3a, the joint 25 (placed like the joint 15) has its aperture directed downwards, that is against the bottom of the packing box 2, the median joint 26 (placed like the joint 16) has its aperture 29 directed inwards and the upper joint 27 (placed like the joint 17) has its aperture 30 directed upwards, that is against the bottom of the rammer 10.

Imperviousness to the fluid is then safeguarded by circular sealing barriers 31, 32 and 33 disposed respectively between the first joint 25 and the control rod 9, the first two joints 25 and 26, and the median joint 26 and the circular wall of the packing box 2. Other barriers 34 and 35 exist between the final two joints 26 and 27 and the upper joint 27 and the control rod 9 and complete imperviousness.

The packing box 2 has approximately an annular width equal to three times the sectional radius of the joints and its height is at the most to about five and a half times the radius of the joints. They can be selected more precisely so that imperviousness can be obtained without causing any friction force adversely affecting the translation or rotational movements of the control rod, that is prevent the joints being over-compressed in an undersized packing box.

The joints 15 to 17 or 25 to 27 rest on one another via slanted surfaces, that is conical-shaped surfaces, which guarantee that they slide onto open another with the desired radial movement so as to establish the sealing are thrustings.

The joint 25 to 27 are shown on FIG. 3b, but the apertures 28 and 30 of the casings of the two extreme joints 25 and 27 are shown in a direction pointing towards the circular wall of the packing box 2. The sealing barriers 31 to 35 remain. Two others 36 and 37 also appear, even between the first joint 25 and the bottom of the packing box 2 and between the third joint 27 and the bottom of the rammer 10. It is thus assumed that imperviousness shall be even better.

Figure 4:
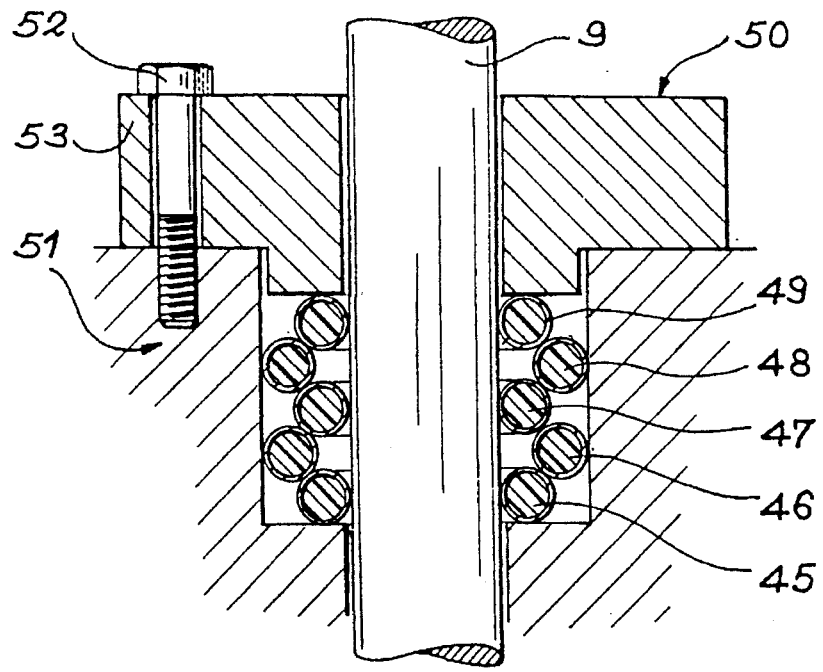

FIG. 4 is a half-sectional view illustrating another embodiment in which the sealing lining is formed of five adjacent metallic joints numbered from 45 to 49 disposed pointing towards a rammer 50. The odd-numbered joints 45, 47 and 49 rest against the control rod 9 like the joints 25 and 27 of the preceding embodiment, and the others 46 and 48 rest against the circular wall of the packing box 2. This configuration improves the guiding of the control rod 9 and may be preferred in extremely high pressure circuits as imperviousness is easier to maintain.

It is to be noted that the rammer 50 has a bent half-section and is applied to the valve body 51 by screws 52 engaged through the outer crown 53 of the rammer 50 which constitutes a flange.

Figure 5:
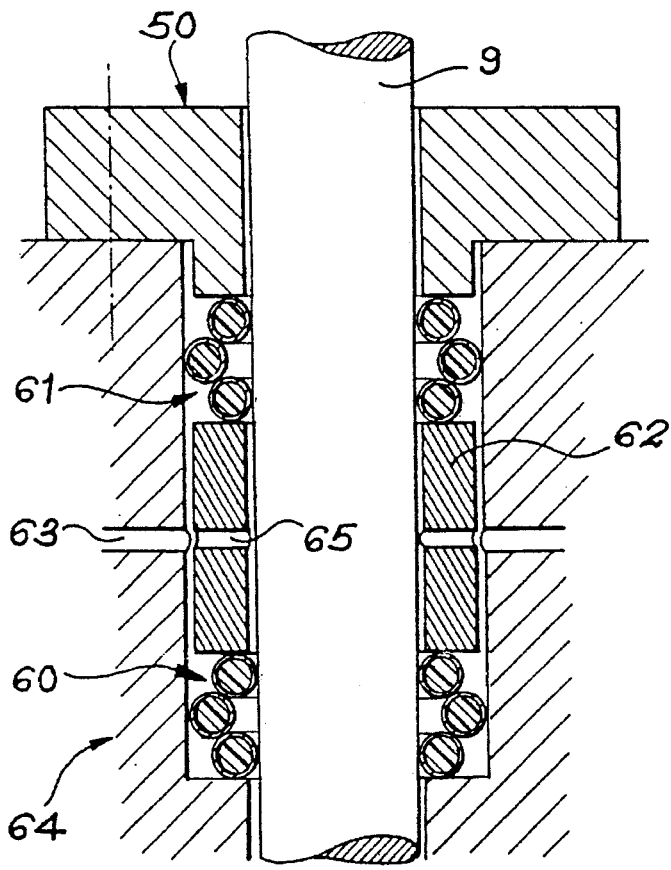

FIG. 5 shows a packing box conforming to the invention where the sealing lining is constituted by two sets of three metallic joints as in FIGS. 2 and 3 and separated by a mechanical element known as a lantern 62. This disposition makes it possible to continuously control the imperviousness of the packing box and possibly introduce a lubrication fluid or an improvement of imperviousness by using an orifice 63 provided to this effect in the valve body 64. The lantern 62 is a cylindrical ring traversed by an orifice 65 which extends that of the valve body 64.

The fluid introduced into the assembly passes through the orifice 65 and reaches the control rod 9. Conversely, the fluid leaking through the packing box fills the orifice 63 and shall thus be detected.

Moreover, one can readily see the advantages of good imperviousness and good guiding of the control rod 9 inherent in the packing box provided with a large number of joints.

Joints whose section is not circular are also possible provided they lend themselves to thrusting and contact effects by conical summit surfaces directed alternately upwards and downwards.

What is claimed is:

1. A packing box disposed around a rod engaged in a solid element, comprising; a housing fitted around a length of the rod, a set of at least three toric joints stacked in the direction of the rod in the housing, and a rammer attached to the solid element so as to press the joints in the housing, wherein some of the joints have internal faces which contact the rod, and the remaining joints have outer faces which contact a peripheral edge of the housing, and wherein the joints having internal faces and the joints having outer faces are stacked alternately and rest on one another via conical-shaped surfaces, and wherein the joints are completely metallic and three of the joints stacked successively have sections whose centers form an angle of between 110° and 140°.

2. The packing box according to claim 1, wherein the joints have an open annular section.

3. The packing box according to claim 1, wherein the number of joints is three, two of said joints being in contact with the rod.

4. The packing box according to claim 1, wherein the number of joints is five, three of said joints being in contact with the rod.

5. The packing box according to claim 1, wherein a lantern for recovering leaks and for injecting fluid into the packing box is inserted between the joints.

6. The packing box according to claim 1, wherein the joints and the rammer are completely metallic and the joints are initially tightened to a defined degree of tightness and the degree of tightness remains fixed for the lifetime of the device.

7. A packing box having a width and a height disposed around a rod engaged in a solid element, comprising; a housing fitted around a length of the rod, a set of at least three toric joints, each having an annular radius, stacked in the direction of the rod in the housing, and a rammer attached to the solid element so as to press the joints in the housing, wherein the width of the packing box is approximately equal to three times the annular radius of the toric joints and the height of the packing box is approximately equal to at the most five and one half times the radius of the toric joints, and wherein some of the joints have internal faces which contact the rod, and the remaining joints have outer faces which contact a peripheral edge of the housing, and wherein the joints having internal faces and the joints having outer faces are stacked alternately and rest on one another via conical-shaped surfaces, and wherein the joints are completely metallic and three of the joints stacked successively have sections whose centers form an angle of between 110° and 140°.

8. The packing box according to claim 7, wherein the joints have an open annular section.

9. The packing box according to claim 7, wherein the number of joints is three, two of said joints being in contact with the rod.

10. The packing box according to claim 7, wherein the number of joints is five, three of said joints being in contact with the rod.

11. The packing box according to claim 7, wherein a lantern for recovering leaks and for injecting fluid into the packing box is inserted between the joints.

12. The packing box according to claim 7, wherein the joints and the rammer are completely metallic and the joints are initially tightened to a defined degree of tightness and the degree of tightness remains fixed for the lifetime of the device.

* * * * *